(12) United States Patent
Finis et al.

(10) Patent No.: US 9,280,575 B2
(45) Date of Patent: Mar. 8, 2016

(54) INDEXING HIERARCHICAL DATA

(71) Applicants: Jan Finis, Munich (DE); Robert Brunel, Heidelberg (DE)

(72) Inventors: Jan Finis, Munich (DE); Robert Brunel, Heidelberg (DE)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 13/946,081

(22) Filed: Jul. 19, 2013

(65) Prior Publication Data
US 2014/0025708 A1    Jan. 23, 2014

Related U.S. Application Data

(60) Provisional application No. 61/673,872, filed on Jul. 20, 2012.

(51) Int. Cl.
   *G06F 17/20*      (2006.01)
   *G06F 17/30*      (2006.01)

(52) U.S. Cl.
   CPC .... *G06F 17/30327* (2013.01); *G06F 17/30221* (2013.01); *G06F 17/30961* (2013.01)

(58) Field of Classification Search
CPC .................. G06F 17/30327; G06F 17/30961; G06F 17/30221; G06F 17/30; G06F 17/30356; G06F 17/30312; G06F 13/4221; G06F 17/30153; G06F 17/30315; G06F 17/30377; G06F 3/04847; G06F 3/0604; G06F 12/0831; G06F 17/30477
USPC .......... 707/797, E17.044, 778, 786, 758, 756, 707/704, 791, 752, 736, 656, 634, 693, 695, 707/829, 956, 802, 809, 801, 813, E17.124; 711/164, 124, 161, 162, 163, 167, 113, 711/100, 120, 121, 122, 123; 709/217, 218, 709/219, 246, 203; 370/254, 255, 256; 719/312; 712/239; 714/45, 38.1, 38.2, 714/38.3, 38.4
See application file for complete search history.

(56) References Cited

U.S. PATENT DOCUMENTS

| | | | | |
|---|---|---|---|---|
| 5,557,786 A | * | 9/1996 | Johnson, Jr. | ...... G06F 17/30961 707/E17.012 |
| 5,630,125 A | * | 5/1997 | Zellweger | ........ G06F 17/30994 707/E17.142 |
| 6,028,987 A | * | 2/2000 | Hirairi | .......................... 717/144 |
| 6,226,788 B1 | * | 5/2001 | Schoening | .......... H04L 41/0213 709/203 |
| 6,347,318 B1 | * | 2/2002 | Rokicki | ........................ 707/752 |
| 6,377,957 B1 | * | 4/2002 | Jeyaraman | ........ G06F 17/30575 707/625 |
| 6,415,279 B1 | * | 7/2002 | Gard et al. | ........................ 711/3 |

(Continued)

OTHER PUBLICATIONS

Ying-Huey Fua, Matthew O. Ward, and Elke A. Rundensteiner—"Hierarchical parallel coordinates for exploration of large datasets"—Proceeding VIS '99 Proceedings of the conference on Visualization '99: celebrating ten years—pp. 43-50.*

(Continued)

*Primary Examiner* — Anh Ly
(74) *Attorney, Agent, or Firm* — Buckley, Maschoff & Talwalkar LLC

(57) ABSTRACT

A system includes generation of an encoding for each of a hierarchy of nodes, each of the nodes associated with one or more attributes, and the encoding for each node including a first pointer and a second pointer, and generation of an order tree comprising a hierarchy of entries, where each pointer of the encoding points to a respective one of the entries, wherein the encoding and the order tree indicate a position of each node in the hierarchy of nodes.

15 Claims, 8 Drawing Sheets

(56) References Cited

U.S. PATENT DOCUMENTS

| | | | |
|---|---|---|---|
| 6,862,354 B1* | 3/2005 | McGrew et al. | 380/42 |
| 7,062,493 B1* | 6/2006 | Babka | G06F 17/30938 707/756 |
| 7,363,284 B1* | 4/2008 | Plasek et al. | 707/E17.012 |
| 7,966,366 B2* | 6/2011 | Alami et al. | 709/203 |
| 8,284,034 B2* | 10/2012 | Stewart et al. | 340/10.41 |
| 8,984,246 B2* | 3/2015 | Dedeoglu | 711/165 |
| 2002/0120598 A1* | 8/2002 | Shadmon et al. | 707/1 |
| 2003/0237047 A1* | 12/2003 | Borson | G06F 17/2247 715/229 |
| 2004/0205473 A1* | 10/2004 | Fisher | G06F 21/41 715/255 |
| 2004/0205547 A1* | 10/2004 | Feldt et al. | 715/512 |
| 2005/0198017 A1* | 9/2005 | Gaponoff | 707/3 |
| 2005/0220129 A1* | 10/2005 | Boyd | 370/428 |
| 2005/0289175 A1* | 12/2005 | Krishnaprasad et al. | 707/102 |
| 2006/0070063 A1* | 3/2006 | Takashige | G06F 8/60 717/174 |
| 2006/0106758 A1* | 5/2006 | Chen et al. | 707/2 |
| 2006/0106832 A1* | 5/2006 | Ben-Dyke et al. | 707/100 |
| 2006/0176403 A1* | 8/2006 | Gritton et al. | 348/581 |
| 2007/0005795 A1* | 1/2007 | Gonzalez | 709/232 |
| 2008/0297379 A1* | 12/2008 | Yang | H03M 7/30 341/50 |
| 2009/0043805 A1* | 2/2009 | Masonis et al. | 707/102 |
| 2009/0138491 A1* | 5/2009 | Chowdhury | G06F 17/30914 707/E17.044 |
| 2009/0222419 A1* | 9/2009 | Lam et al. | 707/E17.127 |
| 2010/0146003 A1* | 6/2010 | Bruso et al. | 707/797 |
| 2010/0313149 A1* | 12/2010 | Zhang | G06F 17/30893 715/760 |
| 2011/0016153 A1* | 1/2011 | Atta et al. | 707/797 |
| 2011/0246503 A1* | 10/2011 | Bender | G06F 17/30306 707/769 |
| 2011/0252310 A1* | 10/2011 | Rahaman | G06F 17/2211 715/255 |
| 2013/0080473 A1* | 3/2013 | Kuno | G06F 17/30584 707/797 |
| 2014/0025708 A1* | 1/2014 | Finis et al. | 707/797 |
| 2014/0136498 A1* | 5/2014 | Finis et al. | 707/695 |
| 2014/0317068 A1* | 10/2014 | Yang | H03M 7/30 707/693 |

OTHER PUBLICATIONS

Agarwal, N.; Galan Oliveras, M.; and Yi Chen—"Approximate Structural Matching over Ordered XML Documents"—Published in: Database Engineering and Applications Symposium, 2007. IDEAS 2007. 11th International; Date of Conference: Sep. 6-8, 2007 pp. 54-62.*

* cited by examiner

```
Algorithm 1 Comparing order tree entries
 1: function COMPARE($e_1, e_2$)
 2:     ($l_1, p_1$) ← INDEX($e_1$)
 3:     ($l_2, p_2$) ← INDEX($e_2$)
 4:     $l_m$ ← max($l_1, l_2$)
 5:     return $p_1 \cdot U^{l_m - l_1} < p_2 \cdot U^{l_m - l_2}$
 6: end function
 7: function INDEX($e$)
 8:     $l$ ← 0
 9:     $p$ ← POS($e$)
10:     $n$ ← NODE($e$)
11:     while $n.parent \neq \perp$ do
12:         $l$ ← $l + 1$
13:         $p$ ← $p + $ POS($n$) $\cdot U^l$
14:         $n$ ← $n.parent$
15:     end while
16:     return ($l, p$)
17: end function
```

Algorithm 2 COMPARE$_{LCA}$ $(e_1, e_2)$

1: $n_1 \leftarrow node(e_1)$
2: $n_2 \leftarrow node(e_2)$
3: $m_1 \leftarrow n_1$
4: $m_2 \leftarrow n_2$
5: while $n_1 \neq n_2$ do
6:    $h_1 \leftarrow n_1.height$
7:    $h_2 \leftarrow n_2.height$
8:    if $h_1 \leq h_2$ then
9:      $m_1 \leftarrow n_1$
10:      $n_1 \leftarrow n_1.parent$
11:    end if
12:    if $h_1 \geq h_2$ then
13:      $m_1 \leftarrow n_1$
14:      $n_2 \leftarrow n_2.parent$
15:    end if
16: end while
17: $p_1 \leftarrow$ if $n_1 = m_1$ then POS$(e_1)$ else POS$(m_1)$
18: $p_2 \leftarrow$ if $n_2 = m_2$ then POS$(e_2)$ else POS$(m_2)$
19: return $p_1 < p_2$

*FIG. 8*

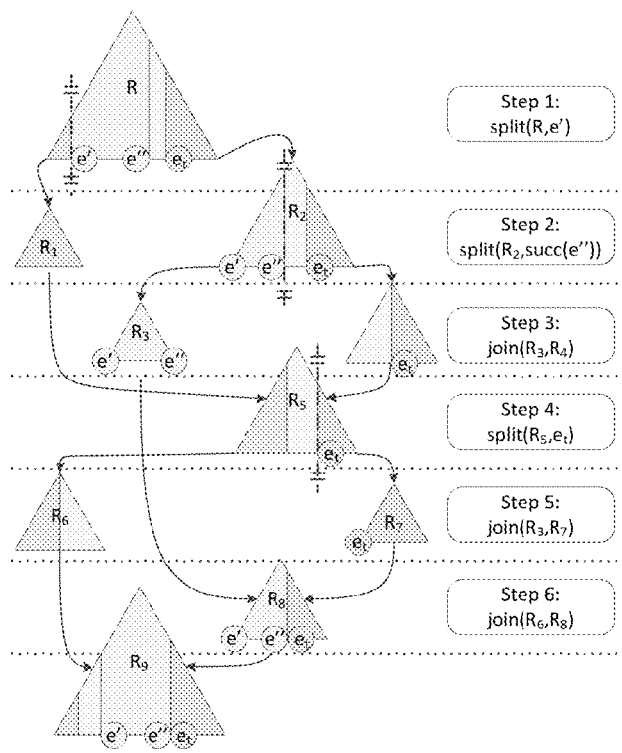

*FIG. 9*

Algorithm 3 Mapping client tree operations to operations on the associated order tree 1: function INSERTCHILD($T, v$)
2:     $e_1 \leftarrow$ INSERTBEFORE($R(T), v.high$)
3:     $e_2 \leftarrow$ INSERTBEFORE($R(T), v.high$)
4:     return ($e_1, e_2$)
5: end function

6: function DELETE($T, v$)
7:     DELETE($R(T), v.low$)
8:     DELETE($R(T), v.high$)
9: end function

10: function RELOCATETO($T, v_1, v_2$)
11:     MOVERANGEBEFORE($R(T), v_1.low, v_1.high, v_2.high$)
12: end function

13: function ISANCESTOR($T, v_1, v_2$)
14:     return COMPARE($v_1.low, v_2.low$)
15:         $\land$ COMPARE($v_2.high, v_1.high$)
16: end function

*FIG. 10*

INDEXING HIERARCHICAL DATA

CROSS REFERENCE TO RELATED APPLICATIONS

This application is related to, and claims benefit to and priority of, U.S. Patent Application Ser. No. 61/673,872, filed on Jul. 20, 2012, the contents of which are hereby incorporated by reference in their entirety for all purposes.

BACKGROUND

Hierarchical data has always been a challenge for relational database management systems (RDBMSs) because a relational model is flat while hierarchies exhibit inherent recursive properties. Nevertheless, many business operations feature hierarchical data. For example, business users need to manage human resource (HR) hierarchies, which model the relationships between employees. Queries on these hierarchies may retrieve all employees who work under a certain supervisor, or may determine whether an employee A is supervised by an employee B. Conventionally, such a query is modeled as a recursive SQL query operating on a parent column. This approach is inefficient.

BRIEF DESCRIPTION OF THE DRAWINGS

FIG. 8 is an algorithm to compare order tree entries according to some embodiments.

FIG. 9 is a visualization of a MOVERANGEBEFORE operation according to some embodiments.

FIG. 10 is an algorithm to map client tree operations to operations on an associated order tree according to some embodiments.

DETAILED DESCRIPTION

The following description is provided to enable any person in the art to make and use the described embodiments. Various modifications, however, will remain readily apparent to those in the art.

Figure 1:
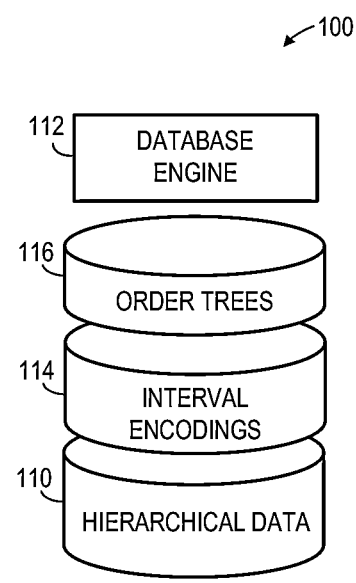
FIG. 1 is a block diagram of a computing system according to some embodiments.

FIG. 1 is a block diagram of database 100 according to some embodiments. FIG. 1 represents a logical architecture for describing systems according to some embodiments, and actual implementations may include more or different components arranged in other manners.

Database 100 may comprise any query-responsive data source or sources that are or become known, including but not limited to a structured-query language (SQL) relational database management system. Database 100 may comprise a relational database, a multi-dimensional database, an eXtendable Markup Language (XML) document, or any other data storage system storing structured and/or unstructured data. The data of database 100 may be distributed among several relational databases, multi-dimensional databases, and/or other data sources. Embodiments are not limited to any number or types of data sources. For example, database 100 may comprise one or more OnLine Analytical Processing (OLAP) databases (i.e., cubes), spreadsheets, text documents, presentations, etc.

Database 100 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, the data of database 100 comprises one or more of conventional tabular data, row-based data stored in row format, column-based data stored in columnar format, and object-based data. Database 100 may also or alternatively support multi-tenancy by providing multiple logical database systems which are programmatically isolated from one another. Moreover, the data of database 100 may be indexed and/or selectively replicated in an index to allow fast searching and retrieval thereof.

Database 100 may store metadata describing regarding the structure, relationships and meaning of the data stored within database 100. This information may include data defining the schema of database tables stored within database 100. A database table schema may specify the name of the database table, columns of the database table, the data type associated with each column, and other information associated with the database table.

Database 100 includes, among other data, hierarchical data 110. Hierarchical data 110 may include any type of hierarchical data that is or becomes known, not limited to the HR data mentioned above. The structure of the hierarchies among hierarchical data 110 may change from time to time. Some of hierarchical data 110 may be versioned, in that one or more past versions of a hierarchy are persisted in database 100.

Database engine 112 performs administrative and management functions for database 100. Such functions may include snapshot and backup management, indexing, optimization, garbage collection, and/or any other database functions that are or become known. For example, database engine 112 may operate as described herein to generate interval encodings 114 and order trees 116.

Interval encodings 114 and order trees 116 facilitate dynamic indexing of hierarchical data 110. In this regard, each node of a hierarchy is assigned a constant number of labels and certain queries can be answered by only considering the node labels. A prominent known labeling scheme is the nested intervals (NI) labeling scheme, in which each node is labeled with an interval [low, high] and the interval for a node v is a proper subinterval of interval of the parent node of v.

Figure 2:
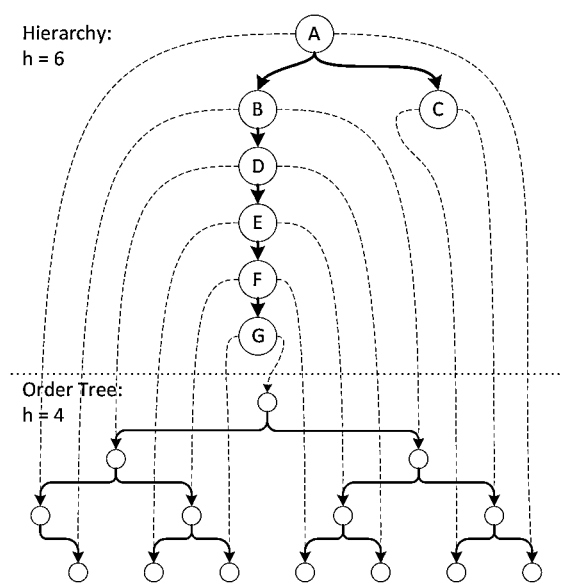
FIG. 2 illustrates a degenerated hierarchy and its balanced order tree according to some embodiments.

A special kind of index is necessary in order to support queries on hierarchical data efficiently. Such an index grants efficient access to various topological information of the hierarchy. For example, consider the hierarchy on top of FIG. 2. The usual strategy to evaluate the recursive query "is employee A a supervisor of employee G?" would be to perform a backward search in the hierarchy starting from G and looking for A, which would traverse the whole path from G to the root A. The query therefore requires worst case O(h) time, where h is the maximum height of the hierarchy. So, while the approach might still be feasible for flat hierarchies, it becomes problematic for deeper ones.

In contrast, a dynamic tree index as described herein may provide insertion, deletion, and subtree relocation in logarithmic time. This may be achieved by encoding the tree with an interval encoding in which each node is encoded by a [low, high] interval and queries can be answered by only considering the interval. However, according to some embodiments, the bounds of this interval are not maintained explicitly as static numbers but instead represented dynamically as nodes in an "order tree", as depicted on the bottom of FIG. 2.

For purposes of the present description, a balanced tree is a tree in which the depth of the left and right subtrees of every node differ by 1 or less. By using an adapted balanced search tree as the order tree, all relevant operations may be supported in worst case logarithmic time. Some embodiments may therefore not only comprise an indexing scheme for hierarchical data, but also a general, straightforward concept for representing a partially or fully-degenerated tree by a balanced one.

As mentioned above, instead of using integers or other numerical values as labels, some embodiments use pointers pointing to an order tree which explicitly maintains the order relation among the bounds. Therefore, the only fact explicitly maintained is the order relation amongst the bound values, and not the values themselves. Because no bound values are maintained, no values need to be shifted upon insertion. In addition, since self-balancing search trees are well-developed in RDBMSs, this well-engineered and optimized technology may be re-used.

By using different kinds of balanced trees, encoding can be tuned towards lower compare times or lower update costs Tuning allows the choice of a particular tradeoff which is appropriate for the application at hand. In addition, the choice of tree allows tuning the index towards main-memory or disk-based usage and allows optimizing the cache-consciousness of the index.

Some embodiments provide an index for hierarchical data which can be regarded as a dynamic representation of the interval encoding. Although the present examples are based on interval encoding, some embodiments may implement pre/post encoding, pre/size/level encoding and other encodings. All desirable update operations may be supported, especially relatively complex update operations like subtree relocation. Concerning queries, we focus on the XPath axis check queries as mentioned above.

The term "dynamic" in the context of nested interval encoding may be defined by the update operations which are to be supported by the encoding and how these operations can be realized on the native interval encoding using integer bounds. The most fundamental tree update operations are node insertion and deletion. The function INSERTCHILD (T,v) inserts a new node into the tree T as a child of node v. As convention, the new node is inserted as rightmost child of v, that is, all other children of v become left siblings of the new node. If sibling ordering is important, a function which allows the insertion at other positions amongst the siblings is supported. Without loss of generality, insertion at the rightmost position is considered herein, since the algorithm for insertion at other positions is similar. The function DELETE (T,v) deletes a node v from T. If the node v has any children, these children become children of the parent of v. Deleting the root results in a forest of children. The function RELOCATETO (T, $v_1$, $v_2$) relocates the subtree rooted at $v_1$ to $v_2$. That is, $v_1$ becomes the rightmost child of $v_2$. The precondition of this operation is that $v_2$ may not be a descendant of $v_1$.

Figure 3:
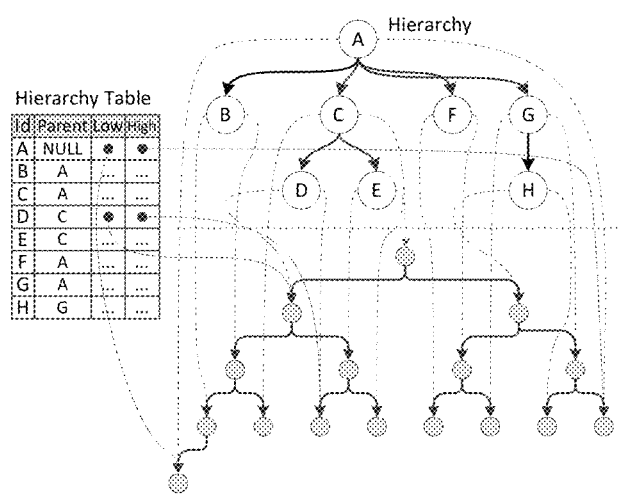
FIG. 3 illustrates a client tree represented by a table and an order tree according to some embodiments.

As mentioned above, the present inventors have noted that the order relation amongst the interval bounds need not be expressed by numeric bounds. Instead, some embodiments encode the order relation into a self-balancing ordered tree. Since this tree encodes the order relation of the interval bounds, it is referred to herein as an "order tree". To distinguish the tree that we encode with the intervals (i.e., the hierarchy) from the order tree, the hierarchy will be referred to as a "client tree". Thus, some embodiments consist of encoding the bounds of the interval labeling of one tree (the client tree) with another tree (the order tree). The interval bounds become pointers to the nodes of the order tree and the order relation is encoded by its structure: A bound $b_1$ represented by an entry $e_1$ in the order tree is less than another bound $b_2$ represented by entry $e_2$, if $e_1$ is left of $e_2$ in the order tree. A node in the client tree therefore corresponds to two entries in the order tree; one for the low and one for the high bound of that node. FIG. 3 shows the example hierarchy on top (client tree) and a balanced binary order tree at the bottom. The dashed arrows show which entries in the order tree correspond to which nodes in the client tree. Dashed arrows leaving a client tree node on the left represent low bounds, arrows leaving on the right represent high bounds. In the database, the hierarchy may be represented by the table (i.e., the interval encoding) on the left of the figure, which contains payload attributes and pointers to nodes in the order tree (only four pointers are displayed for the sake of clarity), and the order tree. The additional parent column is used for building the order tree.

The insertion of new interval bounds is achieved by inserting new nodes into the tree at the appropriate positions. The time complexity of such insertions is usually in O(h) where h is the height of the order tree. Since it is balanced, the height is in O(log b) where b is the number of bounds in the tree. Since we need 2n bounds to represent a client tree of size n, we achieve a time complexity of O(log n). This representation has the advantage that no bound values exist anymore, only their order relation is encoded. Thus, the resulting index does not need to translate bound values as there are no more bound values. The advantage of the order tree in comparison to the client tree is its logarithmic behavior even if the client tree is heavily degenerated. In the worst case, the client tree could be a list of nodes yielding h=n and thus O(n) time complexity for a reachability query using backward search. The advantages of some embodiments are maximized in cases where the client tree can become very deep.

Some embodiments therefore index a possibly degenerated client tree with a balanced order tree while maintaining the topology information of the client tree. By leveraging the balanced shape of the order tree, worst case logarithmic query complexity may be achieved. The order tree can also be used as a general concept for representing the topology of a degenerated tree by a balanced one and may therefore also be useful for other applications.

Order Tree Operations and Properties

An order tree is a concept like a search tree, which can be implemented by different types of trees. Elements in the order tree are called "entries" instead of nodes, for two reasons: First, this allows us to distinguish between "nodes" v in the client tree and "entries" e in the order tree. Second, a node in the order tree might represent more than one entry. For example, a B-tree, which has been adapted to be an order tree instead of a search tree, has more than one entry (key) in a node.

An order tree encodes the strict total order relation < between its entries. All balanced search trees preserve this order under rotations that are needed for rebalancing. Therefore, the order relation is dynamic because it is possible to insert new entries into it or relocate ranges of entries to another position efficiently. The following operations are be supported (R denotes an order tree and e an entry in that tree):

COMPARE ($R,e_1,e_2$) implements the order relation <. Returns true, iff $e_1<e_2$.

INSERTBEFORE (R,e) inserts and returns a new entry e' right before e. That is, after the insert, e'<e, and there is no other entry e'' with e'<e''<e. To be able to insert a new entry as last entry, we allow calling INSERTBEFORE (R,nil)}. In this case, the newly inserted entry e' becomes the greatest element of the order relation, that is, there is no other entry e with e'<e.

DELETE (R,e) removes the entry e from R.

MOVERANGEBEFORE ($R,e',e'',e_t$) moves all entries in the range e',e''], that is, all e with e'≤e≤e'', before the entry $e_t$. The precondition of this operation is that e'≤e'' and $e_t$ is not in [e',e']. The result is that all entries in the range get moved before $e_t$, so e'' becomes the new predecessor of $e_t$. The order among the entries in the range is not changed.

Basically, any type of tree with the following properties can be used as order tree: 1) Entries in the tree are ordered. For any two entries $e_1$ and $e_2$ in the tree, it is possible to efficiently determine if $e_1$ is left or right of $e_2$ (i.e., if $e_1<e_2$). 2) The tree is effectively balanced to guarantee O(log n) time complexity. 3) The tree supports the insertion of a new node to the left/ right of an existing node. 4) It is possible to maintain pointers to the entries in the tree.

Any self-balancing search tree is a good candidate for becoming an order tree after adaptations are performed. One adaptation is that parent pointers usually become necessary, which are usually not found in search trees. Otherwise, it would not be possible to determine efficiently whether a node is to the left or to the right of another one. Another difference is that the nodes no longer carry any keys, so the tree is no longer a search tree.

Property 4 guarantees that it is possible to keep a reference to an entry in the tree. This may be necessary because the order tree is to be used as a hierarchy index for a database table. Consequently, it must be possible to retrieve the lower and upper bounds of a tuple which are represented by the entries in the tree. In order to be able to maintain references to the entries, the memory location of entries in the tree does not change over time or a mapping is maintained which maps from an entry reference to the current memory location of that entry. Whenever the memory location of an entry changes, the mapping must be updated. Pointer-based data structures like AVL- or Red-black-trees usually have firm memory locations per entry and thus need no entry mapping while array-based data structures like B-trees require such a mapping because entries are shifted in the array of their node or are even relocated to other nodes.

Most self-balancing search trees can be used as order trees, because they allow insertion and deletion of entries to the left or right of other entries. Usually, an insertion in a search tree consists of finding the location for the new key and then inserting a new node with that key at the found position. The step of finding the location is not necessary in the order tree, because the insert operation explicitly specifies the insert location of a new entry. Thus, an insertion into an order tree is usually even more efficient than an insertion into a search tree. For example, if the probability of a rotation is less than one, then the insert operation only needs to perform O (1) rotations and therefore also the insertion O(1) for an order tree in contrast to O(log n) for a usual search tree which has to locate the insert location first. The same holds for the delete operation: The entry to be deleted is specified explicitly and does not have to be searched first.

Some embodiments may implement an adapted version of the AVL tree, called "AVL order tree" or "$A^O$-tree" in short, and an adapted version of the B-tree, called "B order tree" or "$B^O$-tree" in short.

Comparing Entries in the Order Tree

The COMPARE($R,e_1,e_2$) operation that implements the order relation in an order tree is usually not found in search trees. Informally, it can be implemented by walking up to the root from both entries and monitoring which entry "was more left". This requires parent pointers which yields a small memory overhead. Another possibility is to walk only to the least common ancestor (LCA) of the entries. For this task however, it is necessary to efficiently determine this ancestor.

The global order < of entries in the order tree, which is to be queried by the COMPARE function, is based on a local order $<_L$ of entries and child nodes in a node of the order tree. This local order depends on the kind of order tree used. For example, a binary order tree based on an AVL-tree has one entry e per node and up to two child nodes $v_l$ (left child) and $v_r$ (right child). For this tree, the local order is defined as $v_l<_L e<_L v_r$. A position number POS is used to encode the position of an entry or a node in the local order relation. Let x be either a node (except for the root) or an entry in the order tree. Let PRED(x) be the predecessor of x in the local order $<_L$ (i.e., PRED(x)$<_L$ x and there is no x' with PRED(x)$<_L$x'$<_L$x). If x is the smallest element with respect to $<_L$, then PRED(x)=⊥. The position number POS(x) of x is defined as follows:

POS(x)=⊥ if x is the root, 0 if PRED(x)=⊥, and POS(PRED(x))+1 otherwise.

Basically, the position of x is one plus the position of its predecessor, starting with zero for the leftmost element in the local order relation. For example, in the binary order tree presented above, POS(e)=1, POS($v_l$)=0 and POS $v_r$)=2. We define the position upper bound U as 1+$\max_x$(POS(x)). This bound is constant per order tree and only depends on the kind of tree used. For example, a binary order tree has always U=3. By definition, the POS function always returns a value of in {0, . . . , U−1}.

Figures 4, 5:
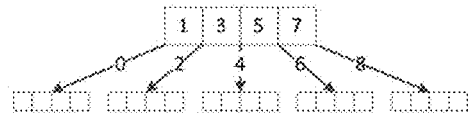
FIG. 4 illustrates POS values of a B-tree node according to some embodiments.
FIG. 5 is an algorithm to compare order tree entries according to some embodiments.

The POS function is used by the algorithm for comparing two entries and thus may be quite fast. For binary order trees, a fast implementation is quite trivial: An entry has always POS(e)=1. For a node, one only needs to check whether the node is a left (0) or a right (2) child. In contrast, a fast implementation for a B-tree is less trivial. Here, U is greater than 1, for example 7 in case of a 2-3-4 tree. FIG. 4 visualizes the POS values for entries and child nodes of a B-tree node with U=9.

For entries, POS can be implemented efficiently by calculating the offset of the entry in the entry array of the node (O(1)). In contrast, the POS operation for nodes is more complex, because, in contrast to the AVL-tree, the position of a node in its parent node may change when the B-tree is updated. A simple implementation would iterate over the child array of a node until the child node is found. This would require O(U) time and is thus infeasible as POS must be very fast.

Binary search as used for locating keys in the usual B-tree look-up is not applicable as there are no keys in the tree. The fastest possibility is to save the POS of each node in the node itself, yielding O(1) time complexity. However, this implementation not only requires extra space but also makes insertion and deletion more costly: While inserting or deleting of child nodes into or from the child array of a B-tree node can be accomplished by MEMCPY-ing the array entries behind the child to be inserted or deleted, respectively, saving the position of each child would require to adjust this position for each child that was moved.

Using the POS function and parent pointers, a simple straightforward implementation of the COMPARE($R,e_1,e_2$) function can be specified as follows: For each of the two entries $e_i$, walk up to the root and build a number $p_i$ of base U where each digit corresponds to the POS of the a node on the path and the least significant digit corresponds to the POS of the entry in its node. If the numbers for $e_1$ and $e_2$ have a different number of digits (i.e., if one entry is farther away from the root than the other), pad the number that has less digits with trailing zeros. Finally, compare whether $p_1 < p_2$ to infer the result. A generic COMPARE function is specified in Algorithm 1 of FIG. 5. Algorithm 1 works for any tree which provides a POS implementation.

The basic idea of Algorithm 1 is to encode the position of an entry into a number and compare the numbers of the two entries. This number is acquired by the INDEX function. The function takes an entry e and returns a pair of a level l and the position number p. The level l is defined as the length of the path from the node in which the entry e is located to the root. The position number p is acquired by starting with the entry position POS(e) and then walking up to the root while adding the node positions POS(n). The added position is multiplied by $U^l$, where l is the length of the path to the current node n, which ensures that nodes closer to the root have a bigger influence on the result p. This result can be viewed as a number of base U, where each digit corresponds to the position of a child node or entry.

If the level l for two entries is the same, their position values have the same number of digits (but leading zeros are possible, of course). The simple comparison of the two position values $p_1 < p_2$ yields the correct answer in this case. For example, consider the results $p_1 = 2311_4$ and $p_2 = 2022_4$.

Figure 6:
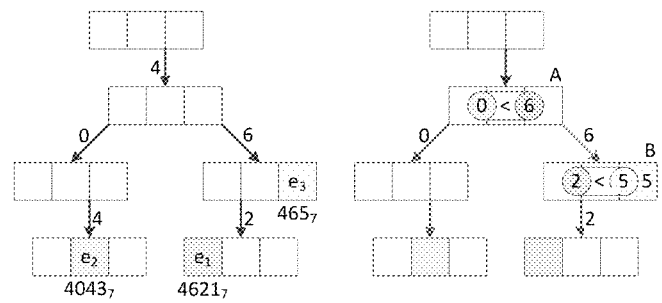
FIG. 6 illustrates comparison of entries in a tree using COMPARE and $COMPARE_{LCA}$ according to some embodiments.

The left side of FIG. 6 shows a 2-3-4 tree (i.e., U=7) with three highlighted entries. For example, the entry $e_1$ in this tree has the value $p_1 = 4621_7$, since it is the first entry in its node (1), this node is the second leftmost node in its parent node (2), the parent is the rightmost node in its parent (6), and this parent is the third node (4) in its parent node, which is the root. In the tree, entry $e_1$ is obviously right of $e_2$, i.e., $e_1 \not< e_2$. This result is computed correctly by the algorithm since $4621_7$ not less than or equal to $4043_7$. The entry $e_3$ has a shorter path to the root yielding the number $p_3 = 465_7$. To compare this entry with $e_1$ the number has to be padded with a trailing zero. The result $e_1 < e_3$ is correctly computed, since $4621_7 < 4650_7$.

Figure 7:
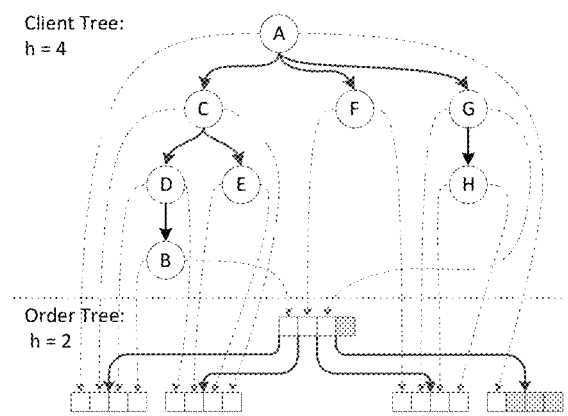
FIG. 7 illustrates a $B^O$-tree representing a client tree according to some embodiments.

As long as the POS function is implemented efficiently, this COMPARE implementation is very fast with a worst case execution time of O(h) where h is the height of the order tree and thus O(log n). If an order tree with large fan-out is used, the comparison is extremely fast, because the height of the tree is quite low. An example for such an efficient tree is the $B^O$-tree with explicitly maintained child positions, as mentioned above. FIG. 7 depicts a client tree and a $B^O$-tree with U=9 encoding the client. Although the client is not too degenerated, the $B^O$-tree still has only half the height of the client tree. Of course, the larger the fan-out of the order tree and the larger the trees, the more noticeable the advantage becomes. For example, with a fan-out of 128, a client tree with one million nodes can be represented by a $B^O$-tree with a height of only 4. Note again, that no binary search is necessary in the nodes, so the only steps to be performed are some arithmetic operations while walking up the tree twice (once from each of the two entries to be compared). Therefore, the comparison is not slowed down by the size of the order tree nodes. Note that it is not necessary to use exactly U as base for the number; any number greater than U can be used as well. This fact can be leveraged by using the next power of two as base for the number. In this case, bit-shifting can be used to assemble the number efficiently.

Although the depicted compare method is already fast, it always walks up to the root. As stated before, it would also be possible to stop at the least common ancestor if the tree allows determining this ancestor efficiently. A generic function COMPARELCA accomplishes this but requires maintaining the height of each node in the order tree. We define the height of a node n, written as n.height as the height of the subtree rooted at n. This height is defined as 1 plus the maximum of the height of all children, with a leaf having height 1.

To find the LCA of two nodes $n_1$ and $n_2$, one can now walk up the tree from both nodes simultaneously until both paths meet at the same node, which is the LCA. To ensure that none of the paths visits and passes the LCA before the other one does, the height of the nodes is used: If one of the nodes has a lower height than the other one, it is surely farther away from the LCA and is thus walked up first. If both nodes have the same height, both paths can be walked one step simultaneously. Once the LCA is found, the result can be computed using the POS function of the node which was visited last on the respective path. If a path was not walked up at all (i.e., the LCA is a node in which one of the entries to be compared resides), the POS of the entry itself is used.

Algorithm 2 of FIG. 8 depicts the COMPARELCA function. The loop performs the walk to the LCA from both nodes. Once the LCA is found, the algorithm infers the result (lines 17-19): By comparing $m_i$ with $n_i$, the algorithm checks whether the respective path was walked up at least one node. The resulting numbers $p_1$ and $p_2$ are then compared to infer the final result.

The right side of FIG. 6 shows how COMPARELCA would compare the entry $e_1$ with $e_2$ and $e_3$: For comparing $e_1$ with $e_2$, the algorithm walks up to the LCA (tagged A). Since both paths were walked up, the algorithm uses POS of the previous nodes on the path. The position of the previous node of the path from $e_1$ is 0 and the position of the previous node of the path from $e_2$ is 6. By comparing 0<6, the algorithm infers the correct result $e_1 < e_2$. For comparing $e_1$ with $e_3$, the algorithm would only walk up one step from $e_1$, since the node B containing $e_3$ is already the LCA of $e_1$ and $e_3$. On the path from $e_1$, the previous node has a POS value of 2. No path was walked up from $e_3$, therefore its POS($e_3$)=5 is used. By comparing 2<5, the result $e_1 < e_3$ is inferred.

Maintaining the height in the order tree nodes is usually a negligible space and time overhead, regardless of the tree implementation used. For example, the AVL-tree already needs to store the balance of each node, using at least 2 bits which usually require an own byte. If an own byte is used, saving the height instead of the balance is usually no memory overhead at all, because one byte is sufficient to represent trees with height up to 256. A balanced tree with that height suffices for all possible applications. For trees with a larger fan-out, like the B-tree, the memory overhead is also quite small because more entries are stored per node. For example, a B-tree with a fan-out of 101 and thus 50 to 100 entries per node and one byte of height information per node needs only 0.01-0.02 bytes per entry for saving the height. This memory overhead can safely be considered negligible.

Bulk-Building the Index

Any order tree can be built incrementally with insert operations. This yields O(n log n) time complexity for building an order tree with n entries. However, when data is bulk loaded or when the order tree index is created on an existing (large) database, the order tree can also be built non-incrementally in O(n), assuming constant time behavior of a hash table. To do this, a representation of the client tree is built in memory which allows an efficient depth-first traversal. This may be done by assigning a child list to each node. Such a representation can be built in O(n) from a table with a parent column. This is done by maintaining a hash table from node key to the respective child list and simply scanning the table. For each node, the child list of its parent is looked up from the hash table and the node is appended to it. Next, the tree is traversed. Instead of assigning low and high integer bounds, the respective entries are added to the order tree and pointers to these entries are used as bounds. Since this yields an assignment of bounds strictly from low to high (i.e., ordered), the usual well-known algorithms for building a search tree bottom up from an ordered set of keys can be used for filling the order tree in O(n). This construction also ensures a high load factor for $B^O$-trees.

Moving Ranges of Entries

To support the MOVERANGE operation which is used to perform the subtree relocation update on the client tree, an order tree must support the two operations SPLIT and JOIN. In short, the SPLIT operation splits a tree at a specific node into two. The resulting trees are appropriately balanced. Two trees can be combined using the JOIN operation, which concatenates one tree to the right of the other. Again, the resulting combined tree is appropriately balanced.

The operation SPLIT(T,e) splits the tree T left of the entry e. This results in two trees, one carrying the entries left of e and one the entries right of e, including e itself. The entry order in the two trees is consistent with the order in the source tree and both trees are balanced.

The operation JOIN($T_1, T_2$) concatenates the two trees $T_1$ and $T_2$ and produces a properly balanced tree T. The leftmost entry in $T_2$ must become the in order successor of the rightmost entry in $T_1$ and the resulting entry order must be consistent with the entry orders in $T_1$ and $T_2$. This implies that each entry originating from $T_1$ is less than each entry originating from $T_2$ in the resulting tree T. Informally, joining two trees simply means appending $T_2$ to $T_1$ and balancing the resulting tree.

Although SPLIT and JOIN are uncommon functions, an efficient O(log n) implementation for most common search trees is known. Therefore, only a brief overview of a possible implementation for the $A^O$-tree is provided herein. An efficient algorithm for JOIN($T_1, T_2$) in the $A^O$-tree is quite easy: Remove the rightmost node n from $T_1$, creating the tree $T_1'$. Use the usual REMOVE function which also ensures that $T_1'$ is properly balanced. Now, make the root of $T_1'$ the left child of n and the root of $T_2$ the right child of n. The resulting tree with root n already satisfies the demanded order properties. However, since n might not be balanced appropriately, balance n using rotations. The algorithm is apparently in O(log n).

The algorithm for the SPLIT(T,e) operation is a bit more complex. Informally, the algorithm walks up the tree from e. Whenever it "crosses the split boundary", i.e., when it encounters a node n on one side of the boundary and its parent n.parent is on the other side of the boundary, then it cuts the link between n and n.parent and instead assigns the previous node which was visited on the side of n.parent as new child of n.parent. The node n now has no more parent. If the boundary is crossed again between n' and n'.parent, then n is used as new child of n'.parent. If no more boundary crossings happen, then n is the new root of one of the resulting trees. The root which was visited last becomes the root of the other resulting tree. Whenever a link is redirected, the resulting subtree has to be rebalanced. Again, the time complexity of the algorithm is (less apparently) in O(log n).

Using SPLIT and JOIN, we are able to relocate whole ranges of bounds in logarithmic time. This is accomplished using MOVERANGEBEFORE(R,e',e", $e_t$) operation, which moves all entries in the range [e',e"] before entry $e_t$. By moving the range [n.low, n.high], this operation can be used to relocate the subtree rooted at n in the client tree.

The basic idea for the implementation of MOVERANGEBEFORE is simple: First, crop the range [e',e"] using SPLIT. Then, split the tree before $e_t$ and insert the range by using JOIN. All in all, three splits and three joins are used to perform this task. FIG. 9 depicts a visual representation of the algorithm.

Here, the trees and the relevant entries are shown in each step. A SPLIT is visualized by a dashed line and yields two result trees which is shown by arrows pointing to the resulting trees. Two trees with arrows to a single other tree represent a JOIN operation of the former two trees resulting in the latter one. First, the tree is split before the lower bound e' and then after the upper bound e". This creates a tree which contains the range to be moved ($R_3$) and two trees left and right of that range ($R_1$ and $R_4$). Next, these two trees are joined, yielding the tree $R_5$. This tree is then split before the target entry $e_t$, resulting in $R_6$ and $R_7$. Finally, the range tree $R_3$ is inserted before $e_t$ by performing two joins. The result is $R_9$ which contains the range [e', e"] right before $e_t$.

Using Order Trees as Index

This section shows how order trees can be used to implement an index for a client tree. It suffices to show how all supported operations are mapped to operations on the order tree. This mapping is depicted in Algorithm 3 of FIG. 10. As shown in the algorithm, the mapping is straightforward. The expression R(T) in the algorithm stands for "the order tree for client tree T'".

The update operations are implemented as follows: The insertion of a new node (INSERTCHILD) is accomplished by inserting two new entries (the new low and high bound) as predecessors of the high bound of the parent v. Deletion of a node v (DELETE) is accomplished by deletion of its bounds. The RELOCATETO function, which relocates the subtree rooted at $v_1$ to become the rightmost child of $v_2$ is performed by moving the range of entries [$v_1$.low, $v_1$.high] before the high bound of $v_2$.

Considering the axis check queries, the algorithm only contains one axis: the ancestor axis (isANCESTOR). All other axis checks are similar; they only differ in the compared bounds. The implementation of the axis check is the same as for integer intervals with the sole difference that the integer compare operation a <b was replaced by the order tree compare operation COMPARE(a,b) (or COMPARELCA(a,b)).

A straightforward mapping of client tree operations to order tree operations has been described. Therefore, the order tree can easily be used for indexing the client tree.

Figure 11:
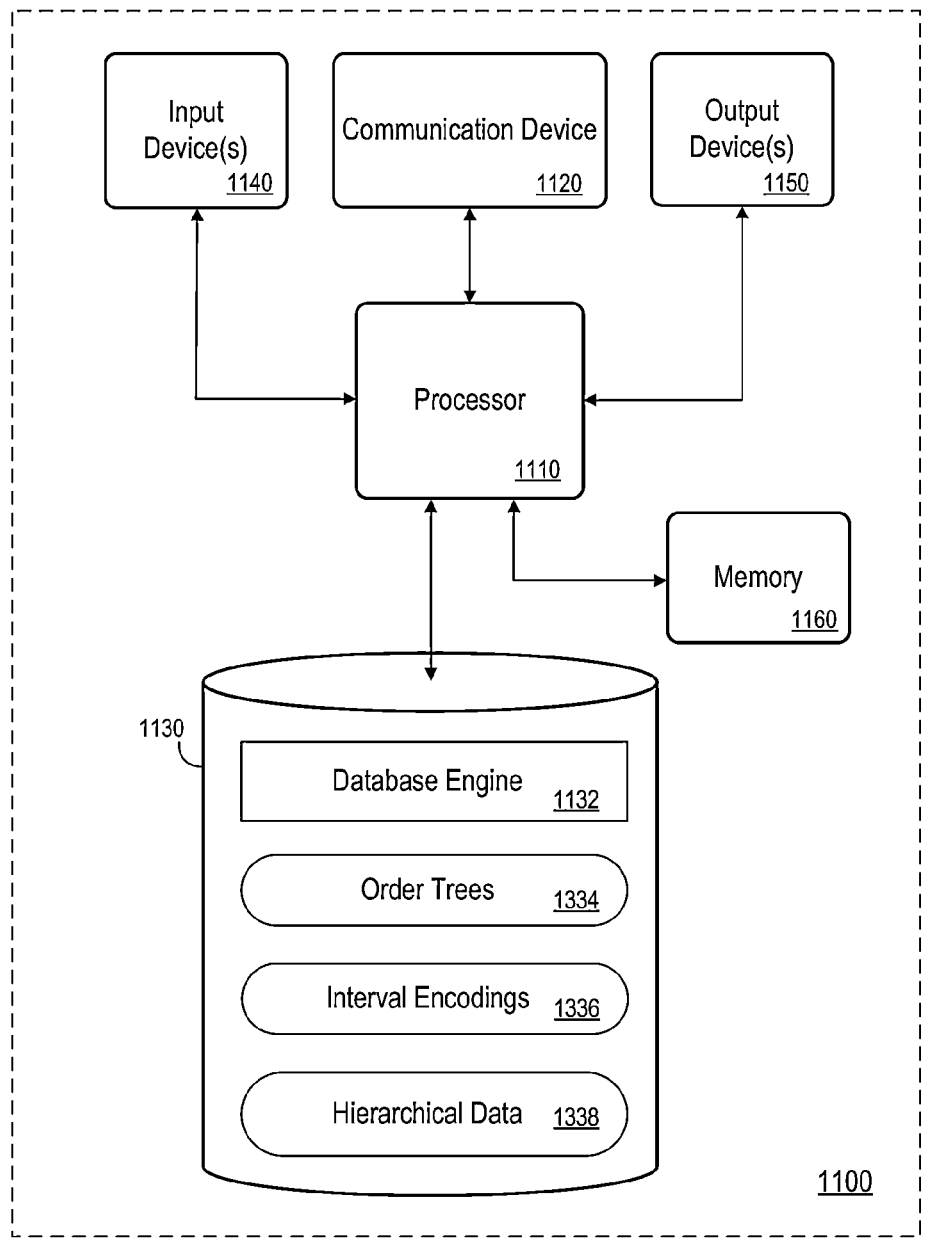
FIG. 11 is a block diagram of a computing system according to some embodiments.

FIG. 11 is a block diagram of system 1100 according to some embodiments. System 1100 may comprise a general-purpose computing system and may execute program code to perform any of the processes described herein. System 1100 may comprise an implementation of database 100 according to some embodiments. System 1100 may include other unshown elements according to some embodiments.

System 1100 includes processor 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen.

Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Database engine 1132 may comprise program code executed by processor 1110 to cause apparatus 1100 to perform any one or more of the processes described herein. Embodiments are not limited to execution of these processes by a single apparatus. Order trees 1134, interval encodings 1136 and hierarchical data 1138 may be implemented as described above. As also described above, database 100 may be implemented using volatile memory such as memory 1160. Data storage device 1130 may also store data and other program code for providing additional functionality and/or which are necessary for operation of system 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Any of the methods described above may be implemented by processing units executing processor-executable program code stored in a memory. Processing units as described herein may be processors, processor cores, multi-core processors, etc.

Actual implementations may include software elements, hardware elements, or any combination thereof. For example, a system may be implemented using any number of computing devices, and one or more processors within the system may execute program code to cause corresponding computing devices to perform processes described herein.

Generally, each logical element described herein may be implemented by any number of devices coupled via any number of public and/or private networks. Two or more such devices may be located remote from one another and may communicate with one another via any known manner of network(s) and/or via a dedicated connection.

Embodiments described herein are solely for the purpose of illustration. Those in the art will recognize other embodiments may be practiced with modifications and alterations to that described above.

What is claimed is:

1. A computing system comprising:
one or more memory storing processor-executable program code; and
one or more processor to execute the processor-executable program code in order to cause the computing system to:
generate an encoding for each of a hierarchy of nodes, each of the nodes associated with one or more attributes, and the encoding for each node including a first pointer and a second pointer;
generate an order tree comprising a hierarchy of entries that is different from the hierarchy of nodes and the encoding, wherein each pointer of the encoding points to a respective one of the entries, and wherein the encoding and the order tree indicate a position of each node in the hierarchy of nodes; and
use the order tree to support queries on the hierarchy of the nodes;
wherein the processor is to execute the processor-executable program code in order to cause the computing system to:
determine an order relation between a first entry of the order tree and a second entry of the order tree based on a structure of the order tree; and
wherein determination of the order relation comprises:
determination of a number $p_1$ where each digit of $p_1$ corresponds to a position of each entry on a first path from the first entry to a root entry of the order tree, and a least significant digit of $p_1$ corresponds to a position of the first entry;
determination of a number $p_2$ where each digit of $p_2$ corresponds to a position of each entry on a second path from the second entry to the root entry of the order tree, and a least significant digit of $p_2$ corresponds to a position of the second entry; and
comparison of $p_1$ and $p_2$.

2. A computing system according to claim 1, wherein the order tree is a balanced binary tree of entries.

3. A computing system according to claim 2, wherein the encoding comprises an interval encoding, and
wherein, for each node, the first pointer indicates a lower interval bound of the node and the second pointer indicates an upper interval bound of the node.

4. A computing system according to claim 1, wherein the encoding comprises an interval encoding, and
wherein, for each node, the first pointer indicates a lower interval bound of the node and the second pointer indicates an upper interval bound of the node.

5. A non-transitory computer-readable medium storing program code, the program code executable by one or more processor of a computing system to cause the computing system to:
generate an encoding for each of a hierarchy of nodes, each of the nodes associated with one or more attributes, and the encoding for each node including a first pointer and a second pointer;
generate an order tree comprising a hierarchy of entries that is different from the hierarchy of nodes and the encoding, wherein each pointer of the encoding points to a respective one of the entries, and wherein the encoding and the order tree indicate a position of each node in the hierarchy of nodes; and use the order tree to support queries on the hierarchy of the nodes;

the program code further executable by a processor of a computing system to cause the computing system to:
determine an order relation between a first entry of the order tree and a second entry of the order tree based on a structure of the order tree; and
wherein determination of the order relation comprises:
determination of a number $p_1$ where each digit of $p_1$ corresponds to a position of each entry on a first path from the first entry to a root entry of the order tree, and a least significant digit of $p_1$ corresponds to a position of the first entry;
determination of a number $p_2$ where each digit of $p_2$ corresponds to a position of each entry on a second path from the second entry to the root entry of the order tree, and a least significant digit of $p_2$ corresponds to a position of the second entry; and
comparison of $p_1$ and $p_2$.

6. A medium according to claim 5, wherein the order tree is a balanced binary tree of entries.

7. A medium according to claim 6, wherein the encoding comprises an interval encoding, and
wherein, for each node, the first pointer indicates a lower interval bound of the node and the second pointer indicates an upper interval bound of the node.

8. A medium according to claim 5, wherein the encoding comprises an interval encoding, and
wherein, for each node, the first pointer indicates a lower interval bound of the node and the second pointer indicates an upper interval bound of the node.

9. A computer-implemented method comprising:
generating an encoding for each of a hierarchy of nodes, each of the nodes associated with one or more attributes, and the encoding for each node including a first pointer and a second pointer;
generating an order tree comprising a hierarchy of entries that is different from the hierarchy of nodes and the encoding, wherein each pointer of the encoding points to a respective one of the entries, and wherein the encoding and the order tree indicate a position of each node in the hierarchy of nodes; and
using the order tree to support queries on the hierarchy of the nodes;
the method further comprising:
determining an order relation between a first entry of the order tree and a second entry of the order tree based on a structure of the order tree; and
wherein determining the order relation comprises:
determining a number $p_1$ where each digit of $p_1$ corresponds to a position of each entry on a first path from the first entry to a root entry of the order tree, and a least significant digit of $p_1$ corresponds to a position of the first entry;
determining a number $p_2$ where each digit of $p_2$ corresponds to a position of each entry on a second path from the second entry to the root entry of the order tree, and a least significant digit of $p_2$ corresponds to a position of the second entry; and
comparing $p_1$ and $p_2$.

10. A method according to claim 9, wherein the order tree is a balanced binary tree of entries.

11. A method according to claim 10, wherein the encoding comprises an interval encoding, and
wherein, for each node, the first pointer indicates a lower interval bound of the node and the second pointer indicates an upper interval bound of the node.

12. A method according to claim 11, wherein the encoding comprises an interval encoding, and
wherein, for each node, the first pointer indicates a lower interval bound of the node and the second pointer indicates an upper interval bound of the node.

13. A computing system comprising:
a memory storing processor-executable program code; and
a processor to execute the processor-executable program code in order to cause the computing system to:
generate an encoding for each of a hierarchy of nodes, each of the nodes associated with one or more attributes, and the encoding for each node including a first pointer and a second pointer;
generate an order tree comprising a hierarchy of entries, where each pointer of the encoding points to a respective one of the entries, wherein the encoding and the order tree indicate a position of each node in the hierarchy of nodes; and
determine an order relation between a first entry of the order tree and a second entry of the order tree based on a structure of the order tree;
wherein determination of the order relation comprises:
determination of a number $p_1$ where each digit of $p_1$ corresponds to a position of each entry on a first path from the first entry to a root entry of the order tree, and a least significant digit of $p_1$ corresponds to a position of the first entry;
determination of a number $p_2$ where each digit of $p_2$ corresponds to a position of each entry on a second path from the second entry to the root entry of the order tree, and a least significant digit of $p_2$ corresponds to a position of the second entry; and
comparison of $p_1$ and $p_2$.

14. A non-transitory computer-readable medium storing program code, the program code executable by a processor of a computing system to cause the computing system to:
generate an encoding for each of a hierarchy of nodes, each of the nodes associated with one or more attributes, and the encoding for each node including a first pointer and a second pointer;
generate an order tree comprising a hierarchy of entries, where each pointer of the encoding points to a respective one of the entries,
wherein the encoding and the order tree indicate a position of each node in the hierarchy of nodes; and
determine an order relation between a first entry of the order tree and a second entry of the order tree based on a structure of the order tree;
wherein determination of the order relation comprises:
determination of a number $p_1$ where each digit of $p_1$ corresponds to a position of each entry on a first path from the first entry to a root entry of the order tree, and a least significant digit of $p_1$ corresponds to a position of the first entry;
determination of a number $p_2$ where each digit of $p_2$ corresponds to a position of each entry on a second path from the second entry to the root entry of the order tree, and a least significant digit of $p_2$ corresponds to a position of the second entry; and
comparison of $p_1$ and $p_2$.

15. A computer-implemented method comprising:
generating an encoding for each of a hierarchy of nodes, each of the nodes associated with one or more attributes, and the encoding for each node including a first pointer and a second pointer;

generating an order tree comprising a hierarchy of entries, where each pointer of the encoding points to a respective one of the entries, wherein the encoding and the order tree indicate a position of each node in the hierarchy of nodes; and determining an order relation between a first entry of the order tree and a second entry of the order tree based on a structure of the order tree;

wherein determining the order relation comprises:

determining a number $p_1$ where each digit of $p_1$ corresponds to a position of each entry on a first path from the first entry to a root entry of the order tree, and a least significant digit of $p_1$ corresponds to a position of the first entry;

determining a number $p_2$ where each digit of $p_2$ corresponds to a position of each entry on a second path from the second entry to the root entry of the order tree, and a least significant digit of $p_2$ corresponds to a position of the second entry; and comparing $p_1$ and $p_2$.

* * * * *